(12) United States Patent
Dollinger et al.

(10) Patent No.: US 9,085,491 B2
(45) Date of Patent: Jul. 21, 2015

(54) CARBON-COATED LITHIUM TITANIUM SPINEL

(71) Applicant: SUED-CHEMIE IP GMBH & CO. KG, Munich (DE)

(72) Inventors: Jasmin Dollinger, Freising (DE); Andreas Pollner, Moosburg (DE); Michael Holzapfel, Freising (DE); Nicolas Tran, Nandlstadt (DE); Norbert Schall, Forstern (DE); Max Eisgruber, Bruckberg (DE)

(73) Assignee: Sued-Chemie IP GmbH & Co. KG, Munich (DE)

( * ) Notice: Subject to any disclaimer, the term of this patent is extended or adjusted under 35 U.S.C. 154(b) by 0 days.

(21) Appl. No.: 14/193,923

(22) Filed: Feb. 28, 2014

(65) Prior Publication Data

US 2014/0175687 A1    Jun. 26, 2014

Related U.S. Application Data

(62) Division of application No. 13/123,089, filed as application No. PCT/EP2009/007196 on Oct. 7, 2009, now abandoned.

(30) Foreign Application Priority Data

Oct. 7, 2008   (DE) .................. 10 2008 050 692

(51) Int. Cl.
| | |
|---|---|
| *H01M 4/485* | (2010.01) |
| *C04B 35/626* | (2006.01) |
| *B82Y 30/00* | (2011.01) |
| *C01G 23/00* | (2006.01) |
| *C04B 35/628* | (2006.01) |
| *C04B 35/636* | (2006.01) |
| *H01M 4/36* | (2006.01) |
| *H01M 4/62* | (2006.01) |
| *H01M 10/052* | (2010.01) |

(52) U.S. Cl.
CPC ........... *C04B 35/62625* (2013.01); *B82Y 30/00* (2013.01); *C01G 23/005* (2013.01); *C04B 35/6268* (2013.01); *C04B 35/62655* (2013.01); *C04B 35/62839* (2013.01); *C04B 35/636* (2013.01); *H01M 4/366* (2013.01); *H01M 4/485* (2013.01); *H01M 4/625* (2013.01); *C01P 2002/32* (2013.01); *C01P 2004/61* (2013.01); *C01P 2004/62* (2013.01); *C01P 2004/64* (2013.01); *C01P 2004/80* (2013.01); *C01P 2006/12* (2013.01); *C01P 2006/40* (2013.01); *C04B 2235/3203* (2013.01); *C04B 2235/3234* (2013.01); *C04B 2235/44* (2013.01); *C04B 2235/442* (2013.01); *C04B 2235/443* (2013.01); *C04B 2235/449* (2013.01); *C04B 2235/48* (2013.01); *C04B 2235/549* (2013.01); *C04B 2235/5409* (2013.01); *C04B 2235/5436* (2013.01); *C04B 2235/5445* (2013.01); *H01M 10/052* (2013.01); *Y02E 60/122* (2013.01)

(58) Field of Classification Search
CPC ....................................................... H01M 4/485
USPC ................. 429/231.1, 231.6; 252/182.1, 500; 264/13; 427/122; 423/598
See application file for complete search history.

(56) References Cited

U.S. PATENT DOCUMENTS

| | | | |
|---|---|---|---|
| 5,545,468 | A | 8/1996 | Koshiba |
| 8,114,469 | B2 | 2/2012 | Zaghib et al. |
| 2002/0195591 | A1 | 12/2002 | Ravet |
| 2004/0202934 | A1 | 10/2004 | Zaghib |
| 2004/0217335 | A1 | 11/2004 | Sterzel |
| 2007/0148545 | A1 | 6/2007 | Amine |
| 2007/0152185 | A1 | 7/2007 | Gauthier |
| 2007/0243467 | A1 | 10/2007 | Zaghib |

FOREIGN PATENT DOCUMENTS

| | | | |
|---|---|---|---|
| CN | 101000960 | | 7/2007 |
| CN | 101000960 | A * | 7/2007 |
| DE | 10319464 | A1 | 11/2004 |
| EP | 1057783 | A2 | 12/2000 |
| EP | 1796189 | A2 | 6/2007 |
| JP | 2005-504693 | | 2/2005 |
| JP | 2005276597 | | 10/2005 |
| JP | 2010086955 | | 4/2010 |
| WO | WO 02/46101 | A2 | 6/2002 |
| WO | WO 2008/067677 | | 6/2008 |

OTHER PUBLICATIONS

CN101000960A MT*
International Search report of PCT/EP2009/007196 mailed Mar. 22, 2010.
Bruce, P.G. et al., "Nanomaterials for Rechargeable Lithium Batteries," Angew. Chem. Int. Ed. 2008, 47, 2930-2946.
Ernst, F. O. et al., "Electrochemically active flame-made nanosized spinels: LiMn2O4, Li4Ti5O12 and LiFe5O8," Materials Chemistry and Physics 101 (2007) 372-378.
Kalbac, M. et al., "Phase-pure nanocrystalline Li4Ti4O12 for a lithium-ion battery," J. Solid State Electrochem (2003) 8:2-6.

(Continued)

*Primary Examiner* — Patrick Ryan
*Assistant Examiner* — Alex Usyatinsky
(74) *Attorney, Agent, or Firm* — RatnerPrestia

(57) ABSTRACT

A carbon-containing lithium titanium oxide containing spherical particle aggregate with a diameter of 1-80 μm, consisting of lithium titanium oxide primary particles coated with carbon. Also, a method for the production of such a carbon-containing lithium titanium oxide as well as an electrode containing such a carbon-containing lithium titanium oxide as active material as well as a lithium-ion secondary battery containing an above-described electrode.

14 Claims, 3 Drawing Sheets

(56) References Cited

OTHER PUBLICATIONS

Wang, G.J. et al., "Preparation and characteristic of carbon-coated Li4Ti5O12 anode material," Journal of Power Sources 174 (2007) 1109-1112.
Chinese Office Action for Application No. 200980139531.6 dated Jul. 7, 2014.
Translation of Japanese Office Action in JP Application No. 2012-020818 mailed Apr. 30, 2014.
Norio Suzuki et al., "Effect of coating Li4Ti5O12 with conductive material and electrochemical characteristics of the same, summary of speeches at 10th chemical battery material seminar meeting" pp. 3-4, Jun. 9, 2008.

* cited by examiner

CARBON-COATED LITHIUM TITANIUM SPINEL

CROSS-REFERENCE TO RELATED APPLICATIONS

This is a divisional application of U.S. Ser. No. 13/123,089, filed May 27, 2011, which is a National Phase application of PCT/EP2009/007196, filed Oct. 7, 2009, which claims priority benefit of German application number DE 10 2008 050 692.3, filed Oct. 7, 2008, the content of such applications being incorporated herein by reference.

FIELD OF THE INVENTION

The present invention relates to carbon-coated lithium titanate $Li_4Ti_5O_{12}$ as well as a method for its production.

BACKGROUND OF THE INVENTION

The use of lithium titanate $Li_4Ti_5O_{12}$, or lithium titanium spinel for short, in particular as substitute for graphite as anode material in rechargeable lithium-ion batteries was proposed some time ago.

A current overview of anode materials in such batteries can be found e.g. in: Bruce et al., Angew. Chem. Int. Ed. 2008, 47, 2930-2946.

The advantages of $Li_4Ti_5O_{12}$ compared with graphite are in particular its better cycle stability, its better thermal load capacity as well as the higher operational reliability. $Li_4Ti_5O_{12}$ has a relatively constant potential difference of 1.55 V compared with lithium and achieves several 1000 charge and discharge cycles with a loss of capacity of <20%.

Thus lithium titanate has a clearly more positive potential than graphite which has previously customarily been used as anode in rechargeable lithium-ion batteries.

However, the higher potential also results in a lower voltage difference. Together with a reduced capacity of 175 mAh/g compared with 372 mAh/g (theoretical value) of graphite, this leads to a clearly lower energy density compared with lithium-ion batteries with graphite anodes.

However, $Li_4Ti_5O_{12}$ has a long life and is non-toxic and is therefore also not to be classified as posing a threat to the environment.

Recently, $LiFePO_4$ has been used as cathode material in lithium-ion batteries, with the result that a voltage difference of 2 V can be achieved in a combination of $Li_4Ti_5O_{12}$ and $LiFePO_4$.

Various aspects of the production of lithium titanate $Li_4Ti_5O_{12}$ are described in detail. Usually, $Li_4Ti_5O_{12}$ is obtained by means of a solid-state reaction between a titanium compound, typically $TiO_2$, and a lithium compound, typically $Li_2CO_3$, at high temperatures of over 750° C., as described in U.S. Pat. No. 5,545,468 or EP 1 057 783 A1.

Sol-gel methods for the production of $Li_4Ti_5O_{12}$ are also described (DE 103 19 464 A1). Furthermore, production methods by means of flame spray pyrolysis are proposed (Ernst, F. O. et al. Materials Chemistry and Physics 2007, 101(2-3, pp. 372-378) as well as so-called "hydrothermal methods" in anhydrous media (Kalbac, M. et al., Journal of Solid State Electrochemistry 2003, 8(1) pp. 2-6).

Since the lithium titanate as electrode is typically compressed to an electrode with carbon, in particular graphite or carbon black, EP 1 796 189 A2 proposes providing complex lithium transition metal oxides ex situ, i.e. after their complete synthesis with a carbon-containing coating. A disadvantage with this method, however, is the large particle size of the contained product, in particular the secondary particle size. Moreover, the carbon coating in this method is located on the secondary and not the primary particles, which leads to poor electrochemical properties, in particular as regards its capacity behaviour.

There was therefore a need to provide a further lithium titanium oxide, in particular a lithium titanate $Li_4Ti_5O_{12}$, which has particularly small particles and improved electrochemical properties.

According to the invention, this object is achieved by a carbon-containing lithium titanium oxide containing spherical (secondary) particle aggregates with a diameter of 1-80 μm consisting of lithium titanium oxide primary particles coated with carbon.

The German terms "Partikel" and "Teilchen" here are used synonymously to mean particle.

In the following, by lithium titanium oxide is meant a lithium titanate which according to the invention includes all lithium titanium spinels of the type $Li_{1+x}Ti_{2-x}O_4$ with $0 \leq x \leq 1/3$ of the spatial group Fd3m and generally also all mixed lithium titanium oxides of the generic formula $Li_xTi_yO$ ($0<x$, $y<1$).

The carbon-coated lithium titanium oxide according to the invention consists, as mentioned, of secondary particles which are formed of primary particles coated with carbon. The secondary particles are spherical in shape.

The result of the particle size according to the invention of the secondary particles is that the current density in an electrode that contains the carbon-coated lithium titanium oxide material according to the invention is particularly high and it has a high cycle stability compared with the materials of the state of the art, in particular EP 1796 189 A2.

Surprisingly, it was also found that the carbon-containing lithium titanium oxide according to the invention has a BET surface area (measured in accordance with DIN 66134) of 1-10 m²/g, preferably <10 m²/g, still more preferably <8 m²/g and quite particularly preferably <5 m²/g. In a quite particularly preferred embodiment, typical values lie in the range of from 3-5 m²/g.

The primary particles coated with carbon typically have a size of <1 μm. It is important according to the invention that the primary particles are small and at least partially coated with carbon, with the result that the current-carrying capacity and the cycle stability of an electrode containing the lithium titanium oxide according to the invention are particularly high compared with non-carbon-coated materials or materials which are not homogeneously coated or compared with materials in which only the secondary particles are coated.

In preferred embodiments of the present invention, the carbon content of the lithium titanium oxide according to the invention is 0.05 to 2 wt.-%, in quite particularly preferred embodiments 0.05 to 0.5 wt.-%.

Surprisingly, it was found that relatively low carbon contents, i.e. thus a relatively thin carbon coating of the primary particles, are sufficient to bring about the above-mentioned advantageous effects in electrodes which contain the material according to the invention.

Of the lithium titanium oxides, $Li_4Ti_5O_{12}$ is preferred because it is particularly well-suited as electrode material.

DESCRIPTION OF THE INVENTION

The object of the present invention is further achieved by a method for the production of carbon-containing lithium titanium oxide comprising the steps of
(a) mixing a lithium salt, a titanium oxide and a carbon-containing compound in a solvent;
(b) drying the mixture from step a);
(c) calcining the dried mixture Depending on the ratios of the lithium salt to titanium oxide, the lithium titanium spinels $Li_{1+x}Ti_{2-x}O_4$ as already described above of the spatial group Fd3m or the mixed lithium titanium oxides of the generic formula $Li_xTi_yO$ can be obtained.

The final carbon content of the lithium titanium oxide according to the invention can also be set during the mixing.

The term "solvent" is here defined such that at least one constituent of the starting substances is at least partially soluble in the solvent, i.e. has a solubility product L of at least 0.5. The solvent is preferably water. In quite particularly preferred embodiments, one constituent of the starting substances is readily soluble in water, i.e. it has a solubility product L of at least 10.

Particularly preferably, the atomic ratio of Li to Ti is 4:5, with the result that in particular phase-pure $Li_4Ti_5O_{12}$ with a carbon coating can be obtained. By phase-pure is meant here that, within the limits of the usual measurement accuracy, no $TiO_2$ can be detected in the rutile phase by means of XRD measurements.

Preferably, the lithium salt for carrying out the method according to the invention is selected from the group consisting of $LiOH$, $LiNO_3$, $Li_2CO_3$, $Li_2O$, $LiHCO_3$, and lithium acetate, since an aqueous solution to which the other starting compounds can be added can be produced particularly easily from these starting compounds.

Preferably, $TiO_2$ in anatase form or in amorphous form is used, which advantageously does not change into rutile as a result of the method according to the invention.

The carbon-containing compounds which are suitable for carrying out the method according to the invention are selected for example from hydrocarbons, such as for example polycyclic aromatics and their compounds, perylene and its compounds, polymers and copolymers, such as for example polyolefins, polypropylene copolymers in powder form, styrene-polybutadiene block copolymers, sugars and their derivatives. Particularly preferred polymers are polyolefins, polybutadienes, polyvinyl alcohol, condensation products from phenol, polymers derived from furfuryl, styrene derivatives, divinylbenzene derivatives, naphthol perylene, acrylonitrile and vinyl acetate, gelatin, cellulose, starch and their esters and ethers and mixtures thereof.

The choice of sugars has proved to be quite particularly preferred for carrying out the method according to the invention, since these dissolve particularly well in water. Of the sugars, lactose, sucrose and saccharose are quite particularly preferred, lactose being the most preferred.

The drying step b) typically takes place in the form of so-called spray drying, in which the obtained mixture is finely sprayed through a nozzle and precipitates in the form of a pre-product. However, any other method in which the starting compounds are homogeneously mixed and then introduced into a gas stream for drying can also be used. In addition to spray drying, these methods are for example fluid-bed drying, rolling granulation and drying or freeze-drying alone or in combination. Spray drying is quite particularly preferred and typically takes place in a temperature gradient of from 90-300° C.

After obtaining the dried product of the aqueous mixture from step a), which advantageously also avoids the solvent problems of other methods of the state of the art, the obtained spray-dried pre-product is calcined at a temperature of from 700 to 1000° C., preferably under a protective atmosphere, in order to avoid possible secondary reactions during the calcining which could lead to undesired results, such as e.g. the oxidation of the carbon coating. Suitable protective gases are e.g. nitrogen, argon, etc. or mixtures thereof.

The present invention also relates to a lithium titanium oxide obtainable by the method according to the invention which is characterized by a particularly small BET surface area and a small particle size of the primary particles as well as of the secondary particles formed from the primary particles, as has already been described above.

The problem of the present invention is further solved by an electrode which contains the carbon-coated lithium titanium oxide according to the invention. Preferably, the electrode is an anode. In particular, it was found here that such an electrode has a capacity ratio between 1 C and 4 C of >85% and a discharge capacity of at least 165 mAh/g at C/10 in a lithium-ion secondary battery.

BRIEF DESCRIPTION OF THE DRAWING

The present invention is described in more detail below with reference to the embodiment examples as well as the figures which are not, however, to be considered limiting.

There are shown in.

EMBODIMENT EXAMPLES

1. General $LiOH.H_2O$ as well as $TiO_2$ in anatase form are used below as starting products. The water content in the case of commercially available $LiOH.H_2O$ (from Merck) varies from batch to batch and was determined prior to synthesis.

A suspension of $LiOH/TiO_2$/lactose was produced at 30-35° C., by first dissolving $LiOH.H_2O$ in water and then adding $TiO_2$ in anatase form as well as lactose while stirring:

Example 1

Production of the Lithium Titanate According to the Invention ($Li_4Ti_5O_{12}$)

9.2 kg $LiOH.H_2O$ was dissolved in 45 l water and then 20.8 kg $TiO_2$ was added. Different quantities of lactose were then added. The quantity of lactose was varied further, batches with 30 g lactose/kg $LiOH+TiO_2$, 60 g lactose/kg $LiOH+TiO_2$, 90 g lactose/kg $LiOH+TiO_2$ were being run in order to vary the quantity of carbon in the lithium titanate according to the invention.

It was surprisingly found that the lactose had the effect of reducing the viscosity of the original suspension, with the result that 25% less water had to be used for the production of a corresponding suspension than in the case without the addition of the lactose. The mixture was then spray dried in a Nubilosa spray dryer at a starting temperature of approx. 300° C. and an end temperature of 100° C.

First, porous spherical aggregates of the order of several micrometers formed.

Then, the product obtained in this way was calcined at 800° C. for one hour under nitrogen atmosphere. Large (1-80-μm) aggregates of aggregated primary particles (particle size of the primary particles <1 μm) were obtained.

Figure 1:
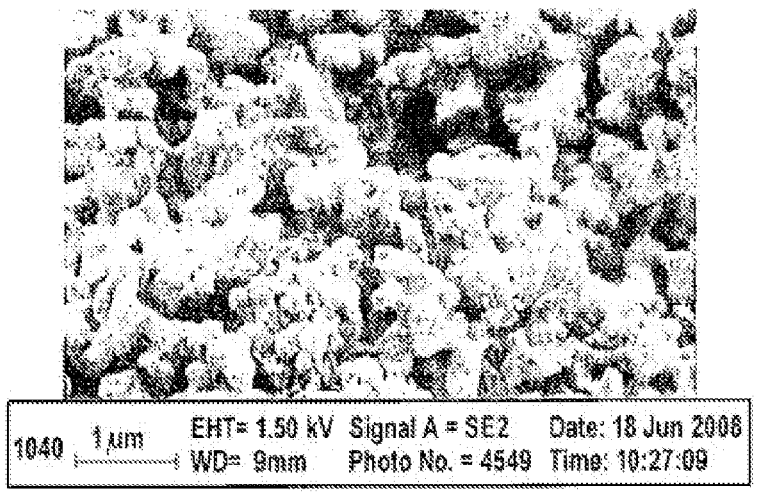
FIG. 1 an SEM micrograph of carbon-coated $Li_4Ti_5O_{12}$ according to the invention.
Figure 5:
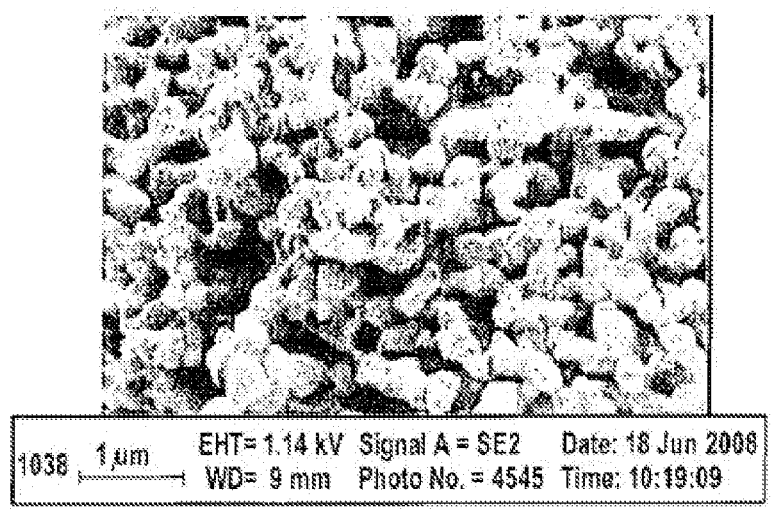
FIG. 5 an SEM micrograph of uncoated $Li_4Ti_5O_{12}$.

FIG. 1 shows the carbon-coated lithium titanate according to the invention with 0.2 wt.-% total carbon content (60 g lactose/kg LiOH+TiO$_2$), while FIG. 5 shows an uncoated lithium titanate also obtained by means of spray drying. The carbon-containing compound in the starting products of the method according to the invention acts as sintering incubator and leads to clearly smaller particles.

Comparison Example

Uncoated lithium titanate was produced according to the method from Example 1, i.e. without addition of lactose.

Figure 4:
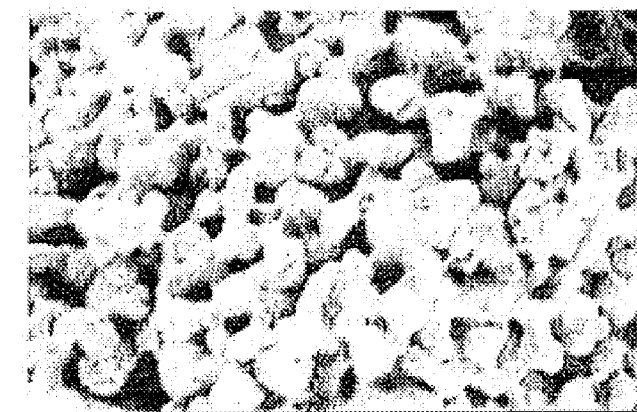
FIG. 4 an SEM micrograph of a subsequently (ex-situ) carbon-coated $Li_4Ti_5O_{12}$.

The thus-obtained and calcined lithium titanate was then impregnated with lactose solution for 3 h and heated for 3 h at 750° C. (cf. EP 1 796 198 A2). An SEM micrograph of the product is represented in FIG. 4 and shows, compared with the product according to the invention according to FIG. 1, clearly coarser particles which likewise consist, not of primary particles with a size <1 μm, but of larger primary particles sintered together. In addition, the secondary particles of the comparison example have a "smeared" coating. The carbon content was likewise approx. 0.2 wt.-%.

Charge/discharge cycles were then carried out with the material according to the invention as well as with the material of the comparison examples, i.e. with the subsequently coated lithium titanate (according to EP 1 796 198 A2) as well as with the uncoated lithium titanate which were both obtained by means of the same method.

Figure 2:
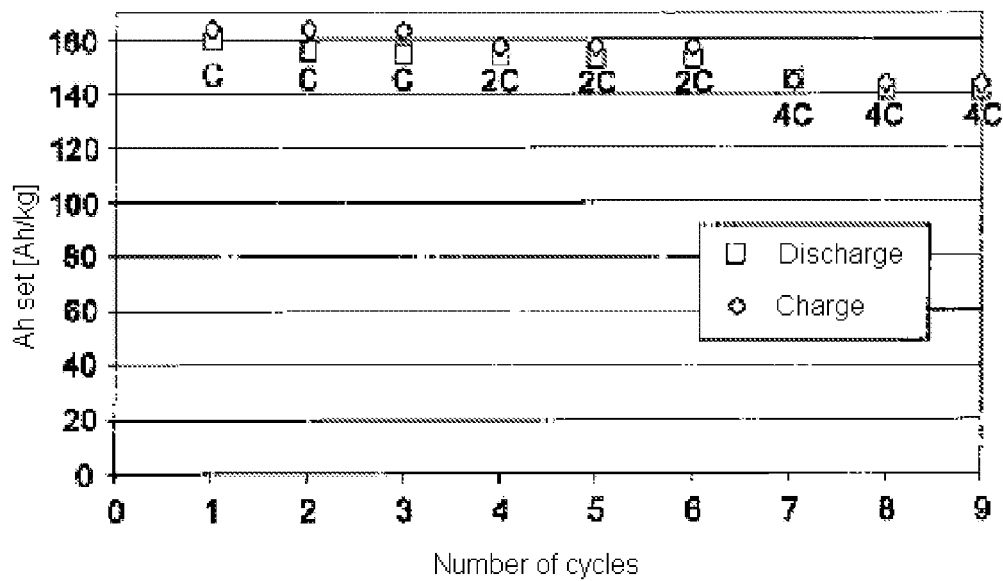
FIG. 2 the diagram showing the charge and discharge capacity of an electrode containing an (in-situ) carbon-coated lithium titanate according to the invention.

The anode consisted in each case of 85% active material, 10% Super P carbon black and 5% PVDF 21256 binder. The measurements took place with the material according to the invention or comparison materials as anode in a half cell compared with metal lithium. The active mass content of the electrode was 2.2 mg/cm$^2$. The range covered in the cycles was 1.0-2.0 volts. FIG. 2 shows charge/discharge curves of carbon-coated lithium titanate according to the invention, wherein the capacity ratio between 1 C and 4 C was 87.5%; the current was the same during charging and during discharging.

Figure 6:
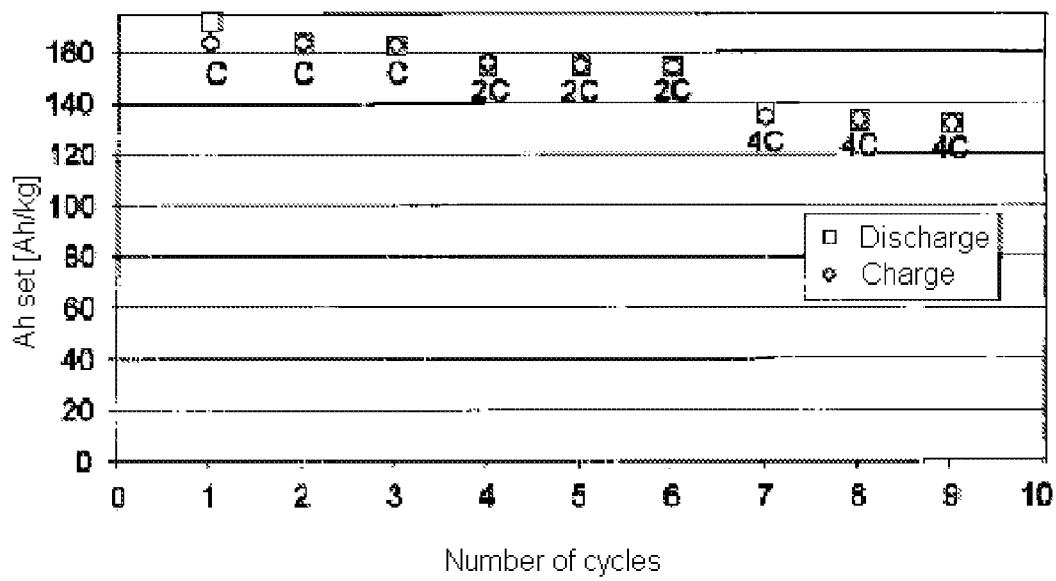
FIG. 6 the charge and discharge capacity of the uncoated $Li_4Ti_5O_{12}$; the current was the same during charging and during discharging.

Compared with the uncoated lithium titanate, a clear stability is to be observed which according to FIG. 6 has a corresponding capacity behaviour of 82%.

Figure 3:
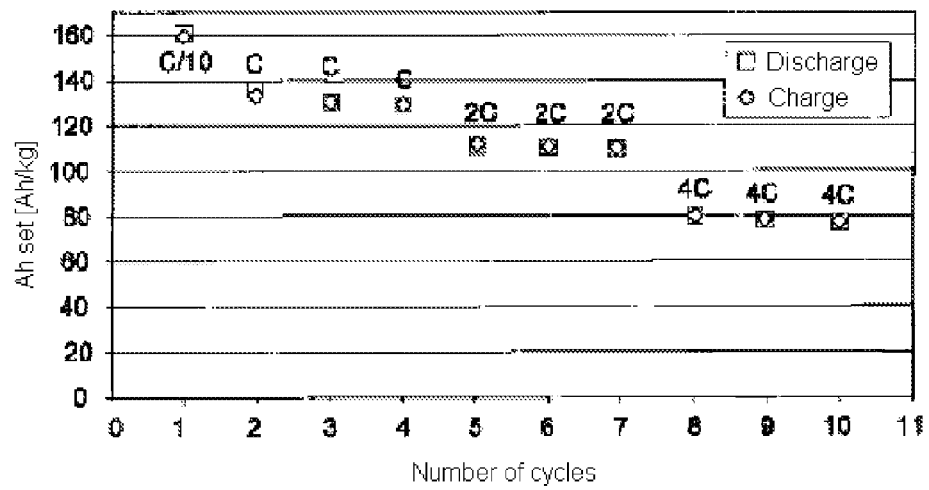
FIG. 3 the charge and discharge capacity of ex-situ coated lithium titanate as comparison.

Likewise, compared with an ex-situ coated lithium titanate (FIG. 3), the material according to the invention, in which only 75% of the capacity was measured at 4 C, is better. The current was the same during charging and during discharging.

The results thus show that the coated in-situ carbon-coated lithium titanate according to the invention has major advantages as regards its capacity ratio compared with a subsequently applied carbon coating or uncoated lithium titanate.

What is claimed:

1. A method for the production of a calcined carbon-containing lithium titanium oxide-containing spherical particle aggregates with a diameter of from 1 to 80 μm, comprising the steps of:
   (a) mixing (1) a lithium salt, LiOH or Li$_2$O, (2) a titanium oxide and (3) a carbon-containing compound in a solvent;
   (b) drying the mixture from step a) by spray drying in a temperature gradient; and
   (c) calcining the dried mixture obtained in step (b) to obtain calcined carbon-containing lithium titanium oxide-containing spherical particle aggregates with a diameter of from 1 to 80 μm.

2. The method of claim 1, wherein the solvent is water.

3. The method of claim 2, having an atomic ratio Li/Ti of 4:5.

4. The method of claim 2, wherein the lithium salt is selected from the group consisting of LiNO$_3$, LiHCO$_3$, and LiCH$_3$COO.

5. The method of claim 3, wherein the TiO$_2$ in anatase form or in amorphous form is used.

6. The method of claim 5, wherein the carbon-containing compound is selected from the group consisting of hydrocarbons, carbohydrates, and polymers.

7. The method of claim 6, wherein the carbon-containing compound is selected from the group consisting of lactose, sucrose and saccharose.

8. The method according to claim 1, wherein the calcined carbon-containing lithium titanium oxide containing spherical particle aggregates produced by the method have a BET surface area in the range of from 1-10 m$^2$/g.

9. The method of claim 1, wherein the spray drying is carried out in a temperature gradient falling within a range of from 90-350° C.

10. The method of claim 1, wherein the calcining is carried out at a temperature of from 700 to 1000° C. under protective atmosphere.

11. The method according to claim 1, wherein the calcined carbon-containing lithium titanium oxide-containing spherical particle aggregates produced by the method have a primary particle size of <1 μm.

12. The method according to claim 1 further comprising making an electrode with the calcined carbon-containing lithium titanium oxide-containing spherical particle aggregates obtained in step (c).

13. The method according to claim 12 further comprising making a lithium ion secondary battery with the electrode obtained in claim 12.

14. The method according to claim 13, wherein the lithium ion secondary battery obtained according to claim 13 has a charge/discharge capacity at C/10 of >165 mAh/g.

* * * * *